Feb. 21, 1939.  J. F. TOENNIES  2,147,940
AMPLIFIER
Filed Oct. 18, 1937   2 Sheets—Sheet 1
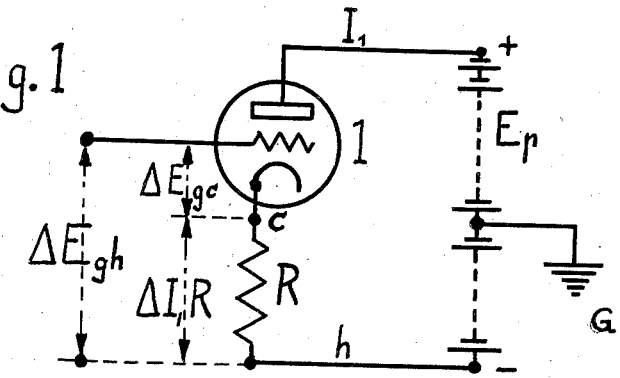
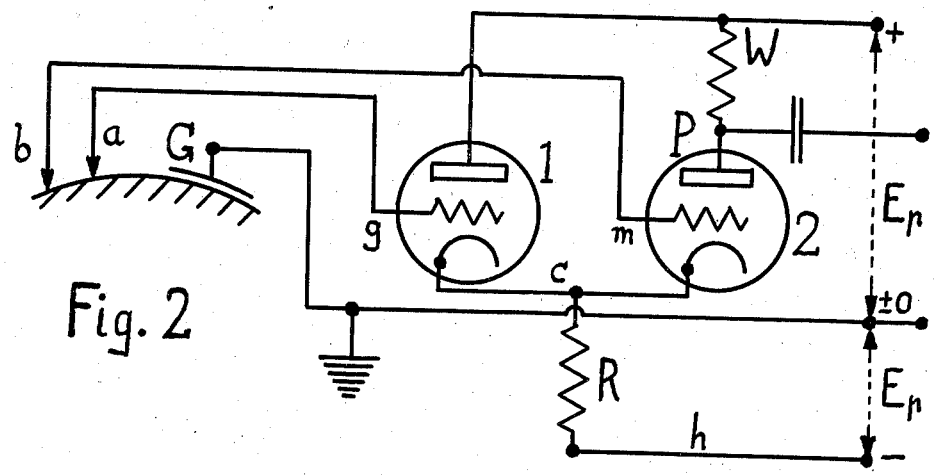
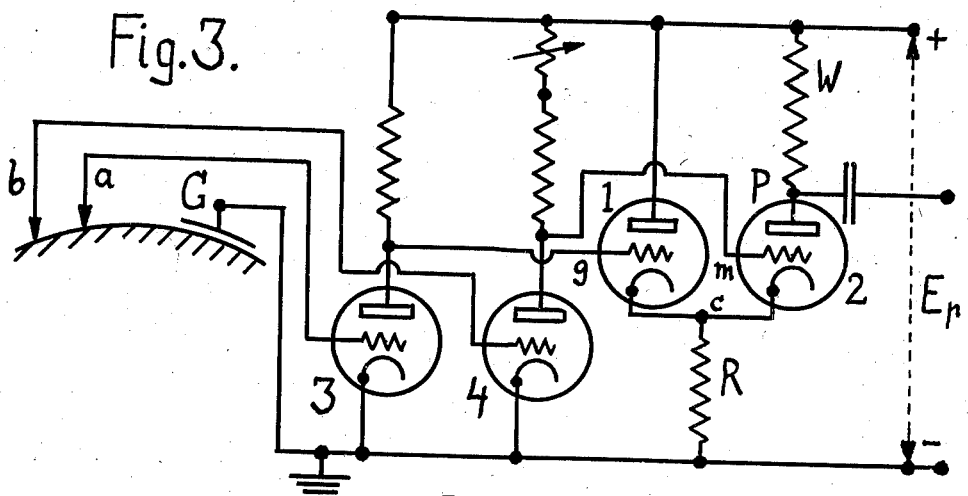
Inventor: Jan Friedrich Toennies

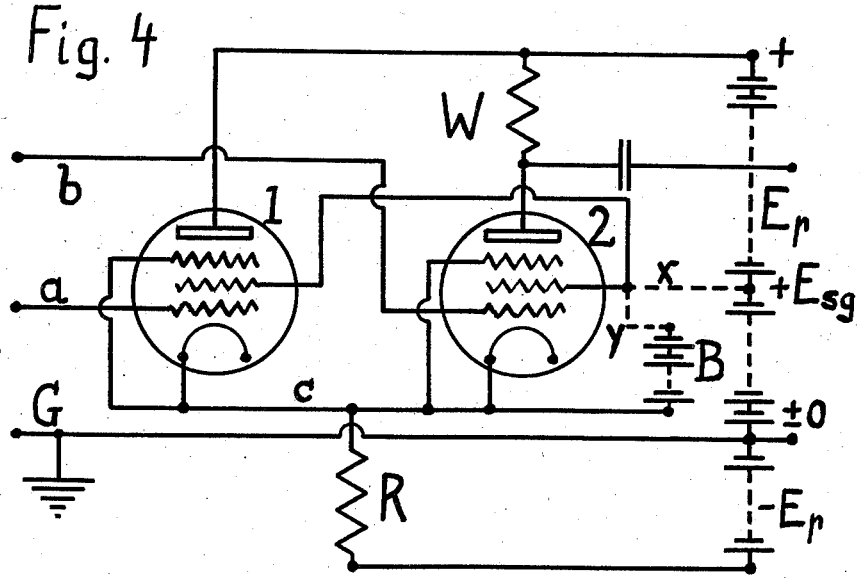

Patented Feb. 21, 1939

2,147,940

UNITED STATES PATENT OFFICE 2,147,940

AMPLIFIER

Jan Friedrich Toennies, New York, N. Y.

Application October 18, 1937, Serial No. 169,636
In Germany October 1, 1936

3 Claims. (Cl. 179—171)

The usual type of amplifiers cannot be used, when input voltages between leads, of which none is grounded, have to be amplified without use of an input transformer. These conditions are given for leads from biological objects when simultaneously the electrical phenomena of several points have to be recorded. On one object only one point can be grounded and due to the fact that all points have connection with the others, the voltages of all points are in relation to the grounded point and to each other. Only the modulation differences between one pair of points are of interest for being recorded without the modulations of these points to the grounded point or to other points of another pair of leads. The isolation of such differences from the modulations against the grounded lead can be accomplished by means of differential amplifiers.

The present invention describes a diagram for such a differential amplifier, which has a specially high accuracy in the differential formation and a high independency from changes in the characteristics of the tubes in use.

The invention is illustrated by four figures, which will show:

Fig. 1, a circuit explaining the function of the amplifier tube 1.

Fig. 2, the fundamental circuit of the differential amplifier.

Fig. 3, a circuit as in Fig. 2, supplemented with a preceding amplifier stage.

Fig. 4, the circuit of the invention operated with pentodes.

Before describing the action of the circuit in Fig. 2, the conditions for the tube 1 may be calculated specially with the Fig. 1. The resistance R of the plate circuit has been changed in its usual position with the plate battery $E_p$. The equation $\Delta I_1.R = G_1.\Delta E_{gc}$ is quite as well valid in this arrangement. $G_1$ represents the effective gain for the tube 1 on a plate resistance R. This tube is not modulated as usual between grid and cathode ($\Delta E_{gc}$) but between the point $h$ and the grid ($\Delta E_{gh}$). The cathode is floating.

$$\Delta E_{gh} = \Delta I_1 R + \Delta E_{gc} = \Delta I_1 R \left(1 + \frac{1}{G_1}\right)$$

$$\Delta I_1 R = \Delta E_{gh} \left(\frac{G_1}{G_1+1}\right)$$

The higher $G_1$ is, the more the factor $$\frac{G_1}{G_1+1}$$

approaches towards 1, but it never reaches 1. The modulations $\Delta_1 R$ on the resistance R, i. e., the modulations of the cathode $c$, are always smaller than the modulations of the grid $g$. It makes no difference to relate the modulations of $g$ and $c$ to the ground G or to the lead $h$, because there is between G and $h$ a fixed voltage, for example—45 volts.

The diagram of Fig. 2 has to fulfill the condition, that on the point P, where the following amplifier stages get their modulation, no modulation exists ($I_2$=const.), as long as the grids $g$ and $m$ of the tubes 1 and 2 are modulated simultaneously with equal amplitude and direction. Such a common modulation may be produced by activities below the electrode G.

Only the voltage differences between the electrodes $a$ and $b$ have to produce a modulation of the point P.

The calculation can be made first for the condition, that the common modulation does not produce changes of $I_2$ and modulations of P. The cathode of the tube 2 is connected with the cathode $c$ of tube 1 and has to follow all the modulations, which are impressed by the modulation of $g$ to the cathode $c$. In the resistance R there will be not only a drop $I_1R$, but also a drop $I_2R$. The latter is for $I_2$=const. also constant and cannot affect therefore the degree of modulation of the cathodes by the grid $g$. The existence of $I_2R$ diminishes only the D. C. value of $I_1R$.

There are three kinds of modulations on tube 2: (1) on the grid $m$, commonly with the grid $g$ the value $\Delta E_{gh}$, which may be =+1; (2) on the cathode of tube 2 will appear due to the modulation of the grid $g$:

$$+1\left(\frac{G_1}{G_1+1}\right)$$

which acts in relation to the grid $m$, and (3) acts in relation to the plate P of tube 2. For $I_2$=const. the potential of P remains fixed. The cathode-plate modulation is thus as effective as a cathode-grid modulation with $$\frac{G_1}{G_1+1} \cdot \frac{1}{\mu_2}$$

$\mu_2$ represents the theoretical amplification factor of tube 2.

The circuit works correctly, when all three modulations of the tube 2 are compensating each other. The two ways of modulation on the cathode, as described above under (2) and (3) are given in the following equation inside the brackets. When these modulations are subtracted from the oppositely acting modulation of the grid $m$ (having the value +1), the result has to be $=0$ for fulfilling the condition, that the plate of tube 2 remains unmodulated.

$$+1-\left(\frac{G_1}{G_1+1}+\frac{G_1}{G_1+1}\cdot\frac{1}{\mu_2}\right)=0=\frac{\mu_2-G_1}{(G_1+1)\mu_2}$$

The equation will be correct, if $\mu_2=G_1$. By use of the same type of tube in place of tube 1 and of tube 2 the gain $G_1$ would be smaller than $\mu_2$. In this case or for any other relation between $G_1$ and $\mu_2$ there will be an error $x$ in the differential formation:

$$x=\frac{\mu_2-G_1}{(G_1+1)\mu_2}$$

$x$ means here the portion of the common modulation, now acting like a voltage difference between the electrodes $a$ and $b$. The dimension of this error $x$ is approximately:

$$\frac{\text{difference from the nominal values}}{\text{product of the amplification factors}}$$

In other diagrams for differential amplifiers the modulation of the one grid is reversed by an amplifier tube and the output of this tube counteracts the output of a main tube. In differential amplifiers of such type the dimension of an error will be:

$$\frac{\text{difference from the nominal value}}{\text{amplification factor of one tube}}$$

That means for the differential amplifier described in this invention, that the error is always $G_1$ or $\mu_2$ times smaller than in other setups.

Another advantage of the described type of differential amplifier is given by the fact that the common modulation for both grids is allowed to be many times larger than the normal range of grid modulation. It has been shown that a modulation $\Delta E_{gh}$ of the grid $g$ of tube 1 is mostly transferred to a voltage change on the cathode, while only a small portion gives a modulation of $E_{gc}$;

$$\Delta E_{gc}=\frac{\Delta E_{gh}}{G_1+1}$$

Thus the common modulation may be $(G_1+1)$ times larger than the useful range of $\Delta E_{gc}$. On tube 2 appears no current change at all, which means that the operating range is there even higher than for tube 1.

It has been shown that there must be $G_1=\mu_2$. By use of the same type of tubes for tube 1 and tube 2, $G_1$ will be smaller than $\mu_2$. For $\mu_2=20$ the value of $G_1$ may be $=18$. The error is under these conditions:

$$x=\frac{20-18}{19\cdot 20}=\frac{2}{380}\text{ or about }\tfrac{1}{2}\text{ percent}$$

The value is already very small without any means of correction. It is without correction smaller in this diagram than it can be maintained with adjustments under practical operating conditions for other phase reversing circuits. There are several possible ways for correcting the remaining error. The grid $m$ has a modulation about $\tfrac{1}{2}\%$ too high. By feeding this grid over a bleeder with the relation 2:380 the error is eliminated. By selecting out of a group of tubes of the same type a steeper one for tube 1 and a less steep one for tube 2, a correction can be obtained without any addition to the diagram. Or it may be used for tube 1 a type with a gain higher than that of the type for tube 2. In this case it may be necessary to reduce the gain of tube 1 to a proper value. A small resistance between the plate of tube 1 and the positive pole of the plate voltage can take out a part of the modulation normally effective on the cathodes, until the correct relation between $G_1$ and $\mu_2$ has been reached.

By addition of an auxiliary amplifier tube it is possible either to raise $G_1$ or to transfer to the point P a very small additional modulation from the grid $g$, which without correction normally is the less effective one.

In Fig. 3 is shown an arrangement, in which the modulations from each electrode are first passing one amplifier stage with the tubes 3 and 4 before they come to the differential stage with the tubes 1 and 2. By correcting the relation of the gains of the tubes 3 and 4, the accurate differential formation may be adjusted. The addition of this prestage (3 and 4) gives the advantage that all changes in heating-, grid- or plate-voltages produce a common modulation for both grids of the differential stage (1 and 2). The common modulations are here eliminated and only the modulation between the electrodes $a$ and $b$ can affect the point P and the following stages of the amplifier. The grids $g$ and $m$ may be D. C.—coupled to the plates of the prestage thus avoiding the negative part of the plate voltage.

The diagram of Fig. 2 can be operated quite as well with screen grid amplifier tubes or with pentodes, as has been illustrated in Fig. 4. The supply of the screen grid voltage can be delivered alternatively over the connection $x$ from a tap $+E_{sg}$ of the positive part of the plate voltage or otherwise over connection $y$ from a special battery B, the negative pole of which is connected with the cathodes. In the first case the calculation of the differential formation has to be made with the values $G_1$ and $\mu_2$ resulting from the connection of the screen grid element as the plate. By use of the battery B, which makes the screen grid of tube 2 follow the modulation of the cathodes, the values $G_1$ and $\mu_2$ derived from the rate of changes between grid and plate can be used. Therefore in this case a higher gain for the voltage differences, which appear between the electrodes $a$ and $b$, will be effective.

This gain for the voltage differences is also by use of triodes (Fig. 2) normally somewhat reduced in comparison with the gain of the same tubes in a normal diagram. The changes of $I_2$ are affecting the drop on the resistance R. Since the total drop on R is mainly given by the potential on the grid $g$: $E_{gh}=E_{gc}+I_1R+I_2\cdot R$, the changes of $I_2$ will produce a change of opposite polarity of $I_1$. This change in turn affects the value of $E_{gc}$;

$$\Delta E_{gc}=\frac{\Delta I_1\cdot R}{G_1}$$

In this way a contra-modulation on the cathodes appears, which reduces the actual gain of tube 2. But this reduction can be kept small, when the value of the plate resistance W of the tube 2 is high compared with the value of R. The changes of $I_2$ are smaller for a high value of W and the contra-modulation will be a smaller one too.

That the foregoing description is based on the connection of the amplifier input with a biological object, does not mean the application of the diagram is limited to such type of source for the modulations.

The cables for long distance communication are normally connected over a transformer to the amplifier set. A condenser-coupled amplifier cannot be used, because the modulations are arriving symmetrically on a pair of wires and sometimes this pair carries commonly with another pair a modulation for another communication. By means of the described differential amplifier the modulation of one pair can be amplified without interference from the modulation common to both wires of the pair. Also other applications for public address systems or for measuring purposes are useful.

What I claim as my invention is:

1. Amplifier with two ungrounded input leads, which are connected to the grids of two amplifier tubes and the modulation between which has to be transferred to a one-side grounded amplifier independent of the common modulation of both input leads with respect to ground or another point, with one tube having a plate circuit load only between the cathode and the minus pole of the plate voltage and with a second tube having the cathode connected to the cathode of the first tube and a plate resistance between the plate and the positive pole of the plate voltage.

2. The invention as set forth in claim 1 with a plate resistance for the second tube which is high in comparison with the resistance connected between the cathodes and the negative pole of the plate voltage.

3. The invention as set forth in claim 1 which has one or more prestages with separate tubes for each input lead.

JAN FRIEDRICH TOENNIES.